UNITED STATES PATENT OFFICE.

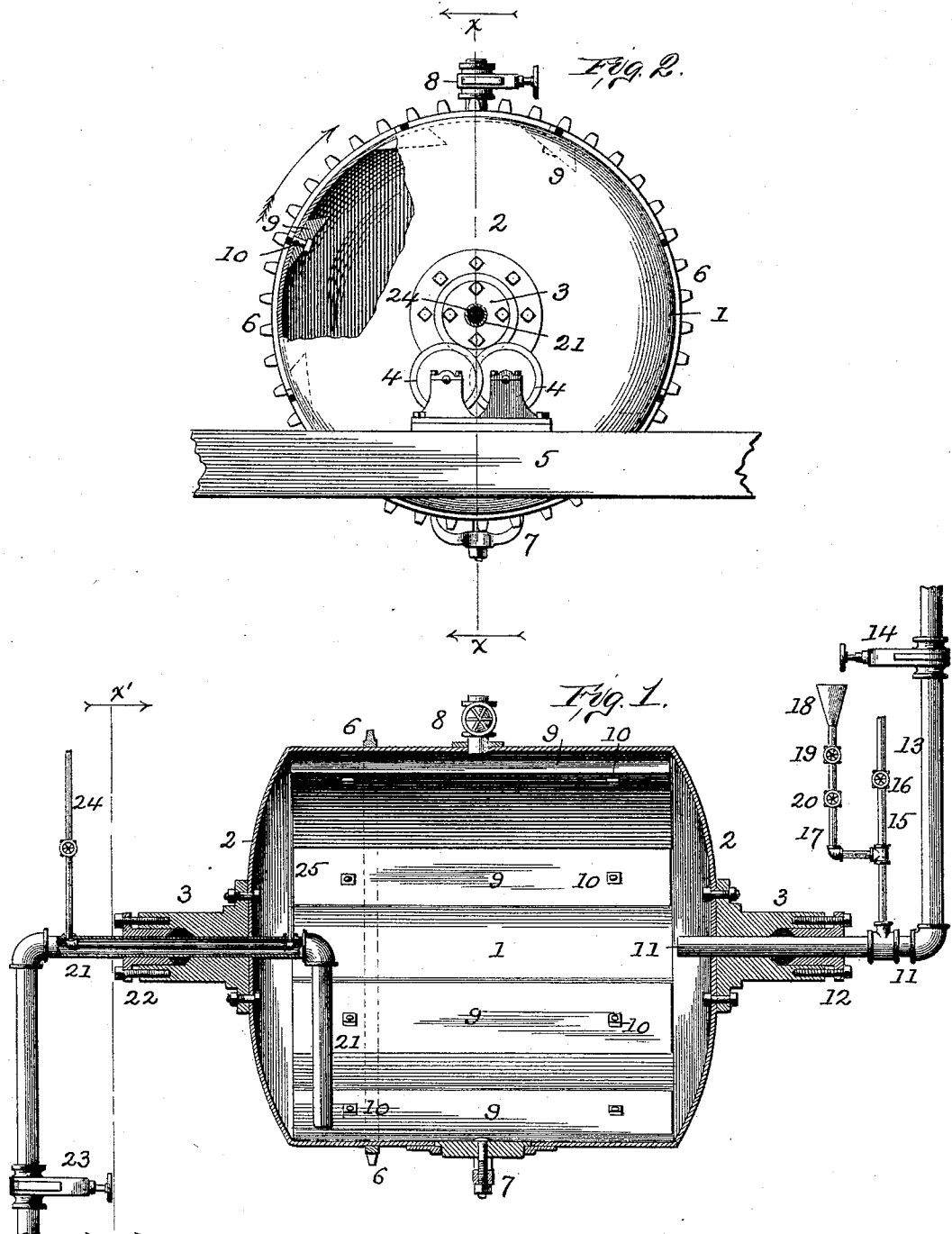

HARRISON B. MEECH, OF CHICAGO, ILLINOIS.

APPARATUS FOR TREATING ORES.

SPECIFICATION forming part of Letters Patent No. 484,861, dated October 25, 1892.

Application filed May 5, 1892. Serial No. 431,976. (No model.)

*To all whom it may concern:*

Be it known that I, HARRISON B. MEECH, a citizen of the United States, residing at Chicago, in the county of Cook and State of Illinois, have invented certain new and useful Improvements in Apparatus for Treating Ores; and I do hereby declare the following to be a full, clear, and exact description of the same, reference being had to the accompanying drawings, forming a part of this specification.

The present invention relates to that class of ore-treating apparatus in which the ore-containing vessel or chamber is caused to rotate during the treatment of the ore, and more especially to that type of rotary closed cylindrical apparatus set forth in my former Letters Patent, No. 277,316, dated May 8, 1883.

The object of the present improvements being in the main to provide an improved construction of such type of apparatus, whereby the operations of feeding and discharging of the apparatus can be effected during the rotation of the same, thus rendering the action of the apparatus rapid, continuous, and economical. I attain such object by the construction and arrangement of parts illustrated in the accompanying drawings, in which—

Figure 1 is a longitudinal sectional elevation at line $x\ x$, illustrating my present invention; and Fig. 2, a transverse sectional elevation at line $x'\ x'$, Fig. 1, with part of the main cylinder in section.

Similar numerals of reference indicate like parts in the different views.

Referring to the drawings, 1 represents a cylindrical drum or tank having closed heads 2, tubular axial trunnions 3, by which the drum is supported in suitable bearings, preferably roller-bearings 4, mounted on the frame or base 5 of the apparatus, motion being communicated to the drum by a sprocket-rim 6, secured to the periphery of the drum or tank 1, and receiving motion through an ordinary drive-chain from any suitable power-source.

7 is a manhole, and 8 a gate or valve arranged diametrically opposite in the periphery of the shell or tank 1, through which access is gained to the interior of the tank and through which the amalgam, quicksilver, &c., is removed in cleaning out the apparatus.

9 is a series of longitudinally-arranged shelves or buckets secured in a detachable manner by bolts 10 to the inner periphery of the tank or drum. These shelves or ribs are preferably of a triangular or prism form, as shown, and are made of copper or a wooden core with a copper covering, as desired or found most convenient.

11 is a feed-pipe extending in through one of the trunnions 3, its passage in a water-tight manner being attained by the packing-gland 12 on the end of the trunnion, as illustrated in Fig. 1. This pipe 11 has a vertical branch 13, that is in communication with the ore-supply, and is provided with a gate or valve 14, by which communication with the interior of the drum or tank is regulated and controlled.

15 is a water-supply pipe connecting with the pipe 11 and having a controlling-valve 16, by which a regulated inlet of water is effected into the interior of the apparatus.

17 is a feed-pipe for quicksilver and chemicals, connected at its lower end with the water-inlet pipe 15 (or directly with the main feed-pipe 11) and having an upper funnel end 18 and a pair of valves 19 and 20, arranged a suitable distance apart, so as to constitute a "feed" while pressure is on the apparatus. Under such condition a feed is effected by first closing the valve 20, opening the valve 19, and pouring the quicksilver or other chemical or reagent into the funnel 18. The valve 19 is then closed and the valve 20 opened, when the quicksilver will flow by gravity down into the interior of the apparatus regardless of the pressure therein.

The desired pressure within the apparatus is maintained, preferably, by the water-supply introduced through pipe 15. A separate pressure-induction pipe may, if desired, be connected to the main inlet-pipe 11 without departing from the spirit of my invention.

21 is the main outlet-pipe, extending out through the trunnions 3 and packing-gland 22, its inner end being bent so as to extend to near the bottom of the drum or tank 1, so that when the valve 23 in said pipe is opened the contents of the tank will be forced out through said pipe.

24 is a valved vent-pipe extending in through the main outlet-pipe 21 and having a vertical inner branch 25, that extends to near the top of the tank or drum 1, the purpose being to admit of the escape of the air from the interior of the drum or tank in the operation of filling the same with ore, water, &c., and through which a pressure of air can be introduced in emptying the apparatus.

The general operation of the present apparatus will be identical with that of my former patented construction, No. 277,316, of May 8, 1883, the shelves 9 acting during the continued rotation of the vessel to carry up the quicksilver from the bottom of the vessel and drop it back upon the reduced ore, and thus keep the quicksilver circulating through the same, the main difference being that with the present improvement the action may be continuous—to wit, fresh ore, quicksilver, &c., being fed in at suitable intervals and the amalgamated ore removed at like stated intervals during the continued rotation of the apparatus.

My present improvements are adapted alike to leaching as well as amalgamating ores, and I therefore do not limit my present invention to any special mode of treating ores.

Having thus fully described my said invention, what I claim as new, and desire to secure by Letters Patent, is—

1. In an amalgamator, the combination of the cylinder 1, closed at both ends and having hollow trunnions 3, the series of shelves 9, secured to the inner periphery of the cylinder, the valved inlet and outlet pipes 11 and 21, extending into the interior of the cylinder through packing-glands 12 and 22, the outlet-pipe being extended downward to near the bottom of the cylinder, the valved water-inlet pipe 15, communicating with the interior of the cylinder, and the quicksilver-inlet pipe 17, having the valves 19 and 20 and communicating with the interior of the cylinder, substantially as set forth.

2. In an amalgamator, the combination of the cylinder 1, closed at both ends and having hollow trunnions 3, the series of shelves 9, secured to the inner periphery of the cylinder, the valved inlet and outlet pipes 11 and 21, extending into the interior of the cylinder through packing-glands 12 and 22, the outlet-pipe being extended downward to near the bottom of the cylinder, the valved water-inlet pipe 15, communicating with the interior of the cylinder, the quicksilver-inlet pipe 17, having valves 19 and 20, and the valved air-vent pipe extending in through the main outlet-pipe and provided with a vertical branch 25, extending to near the top of the cylinder, substantially as set forth.

3. In an amalgamator, the combination of the cylinder 1, closed at both ends and having hollow trunnions 3, the series of shelves 9, secured to the inner periphery of the cylinder, the valved inlet and outlet pipes 11 and 21, extending into the interior of the cylinder through packing-glands 12 and 22, the outlet-pipe being extended downward to near the bottom of the cylinder, the valved water-inlet pipe 15, communicating with the interior of the cylinder, and the valved air-vent pipe extending in through the main outlet-pipe and provided with a vertical branch 25, extending to near the top of the cylinder, substantially as set forth.

In testimony whereof witness my hand this 30th day of April, A. D. 1892.

HARRISON B. MEECH.

In presence of—
ROBERT BURNS,
GEO. H. ARTHUR.